(12) United States Patent
Glacer et al.

(10) Patent No.: US 10,830,691 B2
(45) Date of Patent: Nov. 10, 2020

(54) FLUID SENSOR AND METHOD FOR PROVIDING SAME

(71) Applicant: Infineon Technologies AG, Neubiberg (DE)

(72) Inventors: Christoph Glacer, Munich (DE); Alfons Dehe, Villingen Schwenningen (DE); David Tumpold, Kirchheim b Muenchen (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 16/385,395

(22) Filed: Apr. 16, 2019

(65) Prior Publication Data

US 2019/0331531 A1 Oct. 31, 2019

(30) Foreign Application Priority Data

Apr. 30, 2018 (DE) .......................... 10 2018 206 669

(51) Int. Cl.
*G01N 21/17* (2006.01)
*G01J 5/00* (2006.01)
(Continued)

(52) U.S. Cl.
CPC ........ *G01N 21/1702* (2013.01); *G01J 5/0003* (2013.01); *G01J 5/10* (2013.01);
(Continued)

(58) Field of Classification Search
CPC .. G01J 5/0003; G01J 5/10; G01N 2021/1704; G01N 21/1702; G01N 21/3504;
(Continued)

(56) References Cited

U.S. PATENT DOCUMENTS 5,933,245 A * 8/1999 Wood ................. G01N 21/1702
356/246
2006/0255278 A1* 11/2006 Frodl ................... G01N 21/274
250/343

(Continued)

FOREIGN PATENT DOCUMENTS

DE 69706438 T2 6/2002
DE 102005022288 A1 11/2006
(Continued)

*Primary Examiner* — Chih-Cheng Kao
(74) *Attorney, Agent, or Firm* — Slater Matsil, LLP

(57) ABSTRACT

A fluid sensor includes a housing and a thermal emitter in the housing to emit first thermal radiation into a detection volume of the housing at a first power level during a measurement interval and emit the first thermal radiation at a reduced first power level or not emit said first thermal radiation at all during an intermediate interval disposed outside of the measurement interval. The fluid sensor includes a measuring element in the detection volume to receive a radiation signal during the measurement interval. The fluid sensor includes a second thermal emitter in the housing to emit second thermal radiation at a second power level into the detection volume during the intermediate interval such that a thermal oscillation of thermal radiation in relation to an overall power level of the thermal radiation in the detection volume is at most ±50% during the measurement interval and the intermediate interval.

21 Claims, 10 Drawing Sheets

(51) Int. Cl.
*G01J 5/10* (2006.01)
*G01N 29/02* (2006.01)
*G01N 29/036* (2006.01)
*G01N 29/24* (2006.01)
*G01N 29/34* (2006.01)

(52) U.S. Cl.
CPC ......... *G01N 29/022* (2013.01); *G01N 29/036* (2013.01); *G01N 29/2425* (2013.01); *G01N 29/341* (2013.01); *G01N 29/346* (2013.01)

(58) Field of Classification Search
CPC ........... G01N 2291/021; G01N 29/022; G01N 2291/02809; G01N 29/02; G01N 29/036; G01N 29/222; G01N 29/2425; G01N 29/2431; G01N 29/341; G01N 29/346
See application file for complete search history.

(56) References Cited

U.S. PATENT DOCUMENTS

| | | | | |
|---|---|---|---|---|
| 2013/0075615 A1* | 3/2013 | Starta | ..................... | G01N 21/59 250/341.7 |
| 2017/0089830 A1* | 3/2017 | Dreyer | ..................... | G01J 3/26 |

FOREIGN PATENT DOCUMENTS

| | | |
|---|---|---|
| DE | 102015012429 A1 | 3/2017 |
| EP | 1722214 A1 | 11/2006 |
| WO | 9829733 A1 | 7/1998 |

* cited by examiner

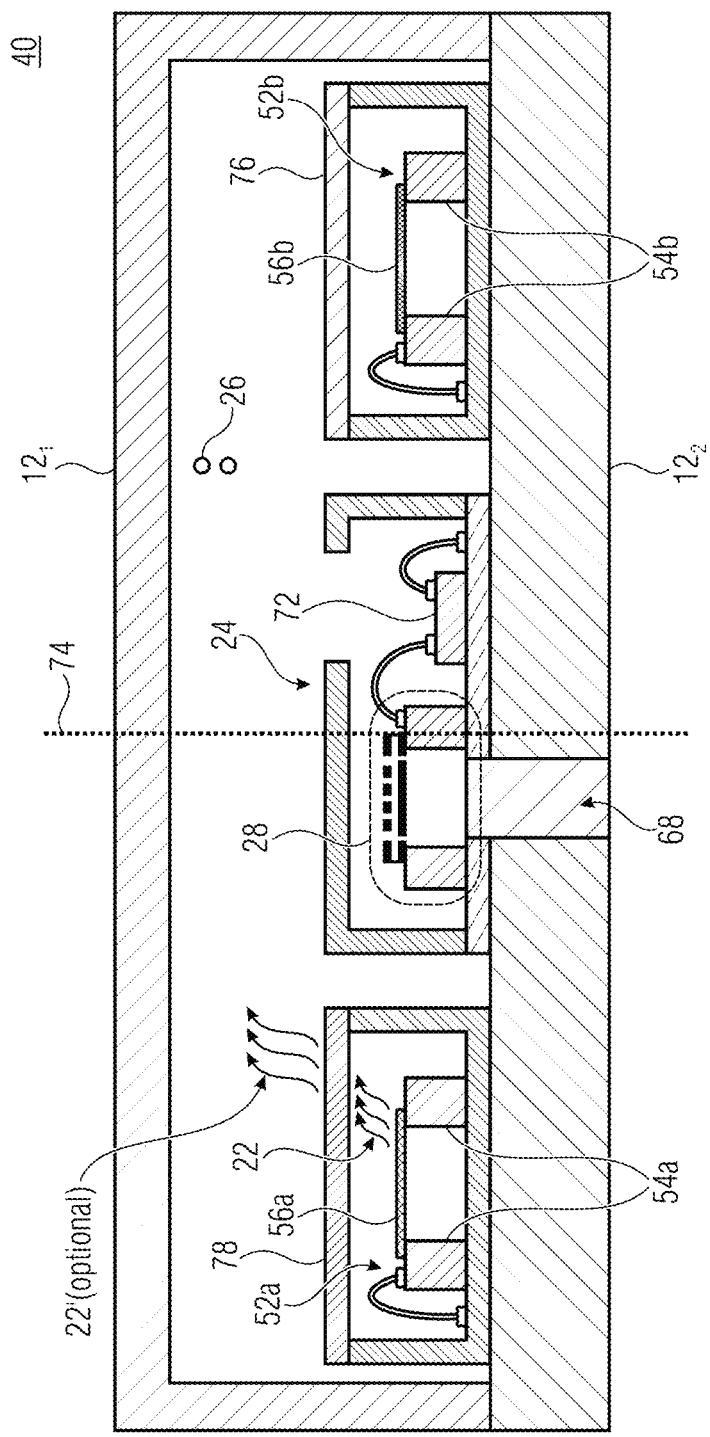

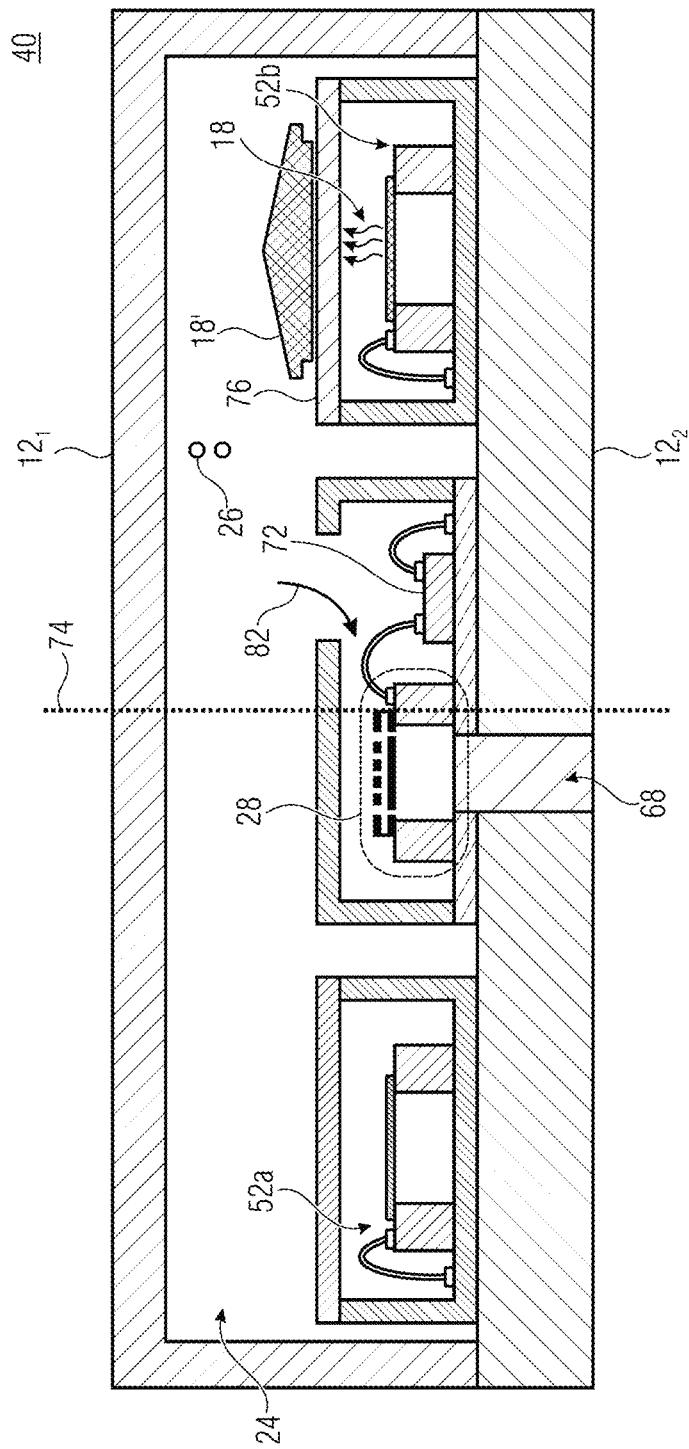

FLUID SENSOR AND METHOD FOR PROVIDING SAME

This application claims the benefit of German Application No. 102018206669.8, filed on Apr. 30, 2018, which application is hereby incorporated herein by reference.

TECHNICAL FIELD

The present disclosure relates to a fluid sensor, for example a gas sensor, and to a method for providing same. Further, the present disclosure relates to an energetically balanced thermoacoustic system.

BACKGROUND

Photoacoustic sensors (PAS) may have an infrared emitter (signal source) and a measuring element (signal sink), between which an absorption path is arranged. Thermal radiation can be transmitted from the emitter to the measuring element through the absorption path, with some of the thermal radiation being manipulated or absorbed in the absorption path by a gas situated there, meaning that the gas acts as a filter. The filtered radiation can be received and evaluated by the measuring element, as a result of which deductions are facilitated about the fluid/gas situated in the absorption path.

Fluid sensors that provide measurement results with high precision would be desirable.

SUMMARY

Exemplary embodiments create a fluid sensor comprising a housing and a first thermal emitter that is arranged in the housing and configured to emit first thermal radiation into a detection volume of the housing, which contains a measurement gas, at a first power level during a measurement interval and emit the first thermal radiation at a reduced first power level or not emit said first thermal radiation at all during an intermediate interval disposed outside of the measurement interval. The fluid sensor comprises a measuring element that is arranged in the detection volume and configured to receive a radiation signal, which is based on the first thermal radiation, during the measurement interval. The fluid sensor comprises a second thermal emitter that is arranged in the housing and embodied to emit second thermal radiation at a second power level into the detection volume during the intermediate interval such that a thermal oscillation of thermal radiation in relation to an overall power level of the thermal radiation in the detection volume, which is based on a sum of the first power level and the second power level, is at most $\mp 50\%$ during a contiguous period of time comprising the measurement interval and the intermediate interval. This means that the second thermal emitter supplies thermal radiation into the detection volume during the intermediate intervals such that the thermal oscillation or the thermal modulation remains low and little influencing of the measurement result by the thermal oscillation is obtained as a result thereof, leading to precise measurement results. The effect referred to as thermal oscillation in the context of the present disclosure relates specifically to thermal modulation. Some of the effects addressed by the present disclosure may be based on the thermal modulation depth. A thermal oscillation described herein may specifically relate to a thermal overall modulation of the fluid sensor.

A further exemplary embodiment develops a method for providing a fluid sensor. The method comprises providing a housing and arranging a first thermal emitter in the housing such that the first thermal emitter is configured to emit first thermal radiation into a detection volume of the housing, which contains a measurement gas, at a first power level during a measurement interval and emit the first thermal radiation at a reduced first power level or not emit said first thermal radiation at all during an intermediate interval disposed outside of the measurement interval. The method comprises arranging a measuring element in the detection volume such that the measuring element is configured to receive a radiation signal, which is based on the first thermal radiation, during the measurement interval. The method comprises arranging a second thermal emitter in the housing such that the first thermal emitter is embodied to emit second thermal radiation at a second power level into the detection volume during the intermediate interval such that a thermal oscillation or thermal modulation of thermal radiation in relation to an overall power level of the thermal radiation in the detection volume, which is based on a sum of the first power level and the second power level, is at most $\pm 50\%$ during a contiguous period of time comprising the measurement interval and the intermediate interval.

BRIEF DESCRIPTION OF THE DRAWINGS

Exemplary embodiments are explained below with reference to the attached drawings. In detail:

FIG. 3c shows a schematic plan view of a thermal emitter according to an exemplary embodiment, said thermal emitter likewise being configured to implement the functionality of both thermal emitters of FIG. 1a;

FIG. 4a shows a schematic lateral sectional view of a fluid sensor according to an exemplary embodiment, which is usable as a microphone at the same time and which is in an intermediate interval state;

FIG. 4b shows the fluid sensor of FIG. 4a in a state as may be obtained during the measurement interval, for example;

DETAILED DESCRIPTION OF ILLUSTRATIVE EMBODIMENTS

Before exemplary embodiments are described in more detail below on the basis of the drawings, reference is made to the fact that identical or functionally equivalent elements, objects and/or structures or elements, objects and/or structures with the same effect are provided with the same reference signs in the different figures such that the description of these elements presented in the different exemplary embodiments is interchangeable or can be applied to one another.

Some of the exemplary embodiments described below relate to fluid sensors, in particular fluid sensors that bring about deflection of a membrane structure on the basis of thermal radiation, which deflection is measurable and/or evaluable. So-called photoacoustic sensors (PAS) are an example of such fluid sensors. Here, a measurement gas to be examined is exposed to electromagnetic radiation such that the measurement gas interacts with the electromagnetic radiation. By way of example, the measurement gas may manipulate and/or absorb certain wavelength ranges of electromagnetic radiation. In general, the measurement gas can be excited on the basis of the electromagnetic radiation. This excitation can be transferred to the measuring element, e.g., a deflectable structure, for instance a cantilever structure or membrane structure. This deflection can be determined in a manner comparable to an evaluation of a microphone. Consequently, the excitation of the measurement gas can be deduced from knowledge of the emitted electromagnetic radiation and the evaluation of the interaction of the measurement gas with the measuring element. Here, the excitation and, in particular, the absorption and/or manipulation of wavelength ranges can be influenced by constituent parts and/or the concentration thereof in the measurement gas, and so deductions about constituent parts in the measurement gas and/or the concentration thereof are possible on the basis of the evaluation of the deflectable element.

Energy-rich electromagnetic radiations can be used to excite the measurement gas, for example thermal radiations and/or infrared radiations. These can easily be produced, for example by heating elements or thermal emitters.

Thermal radiation can heat the measurement gas such that an expansion of the measurement gas is implemented on the basis of different constituents in the measurement gas and the interaction thereof with the thermal radiation. The expansion of the measurement gas can lead to a changeable pressure on the measuring element, causing a deflection of the latter and being evaluable. At the same time, a varying composition of the measurement gas may cause different changes in characteristic properties of the measuring element, which is likewise evaluable, for example a resonant frequency of a membrane.

Figure 1A:
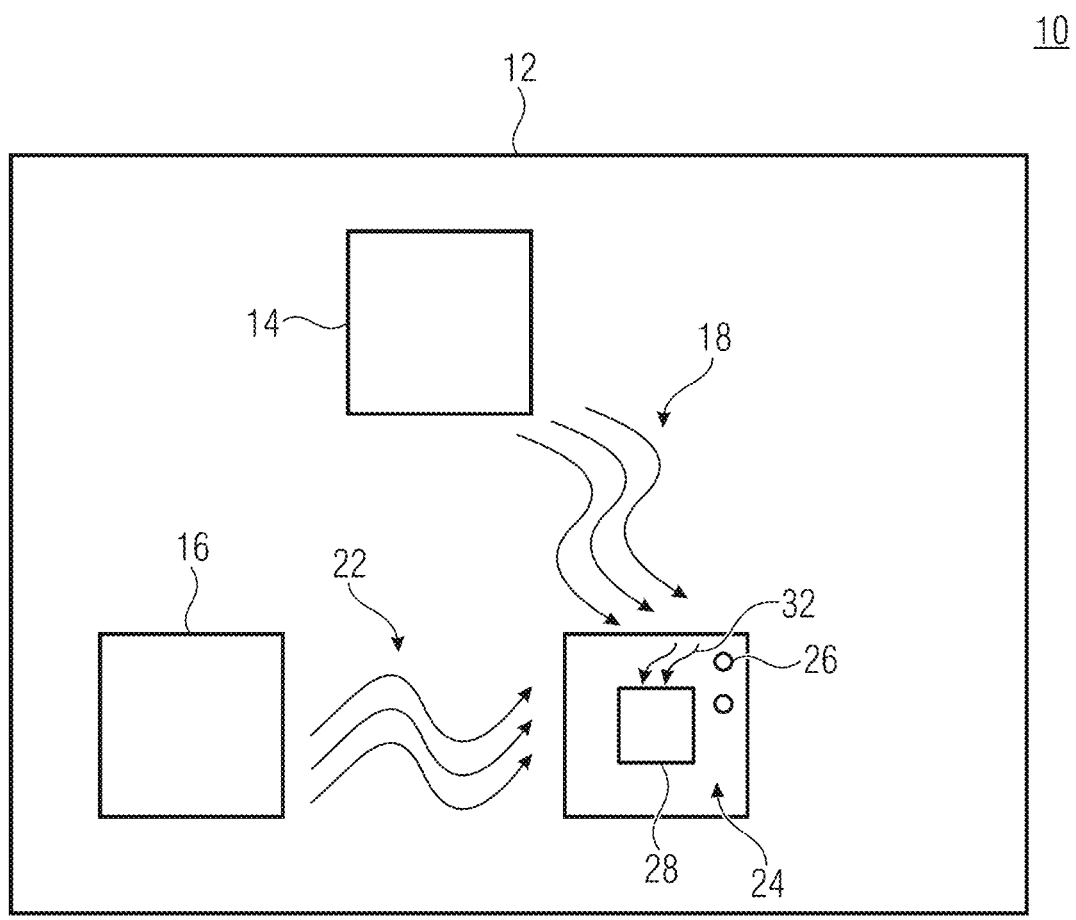
FIG. 1a shows a schematic block diagram of a fluid sensor according to an exemplary embodiment.

FIG. 1a shows a schematic block diagram of a fluid sensor 10 according to one exemplary embodiment. The fluid sensor 10 can be formed as a thermoacoustic or photoacoustic fluid sensor; however, it is not restricted thereto. Instead, the exemplary embodiments can be transferred to other sensor concepts, in which a variable temperature influx of individual components may lead to measurement inaccuracies.

The fluid sensor 10 comprises a housing 12 and two thermal emitters 14 and 16, which are arranged in the housing 12 and which are configured to alternately emit thermal radiation 18 and second thermal radiation 22, respectively. Here, alternating should not be understood to mean that the activity of one of the thermal radiations 18 or 22 necessarily assumes the inactivity of the other thermal radiation 22 or 18 at all times. Instead, the thermal emitter 14 is configured to emit the thermal radiation 18 into a detection volume 24 of the housing during a measurement interval. A measurement fluid 26, in particular a measurement gas, for example a gaseous substance mixture, is arranged in the detection volume 24, wherein vapor-phase constituents and/or solids bound in a gas or a liquid may also be arranged therein. Even though the detection volume 24 represents a closed volume in the housing 12, the embodiments of the present disclosure are not restricted thereto. Instead, the detection volume 24 may also be an open volume in the housing 12 and/or comprise the entire volume of the housing 12. This means that the emitter 14 and/or the emitter 16 may also be arranged within the detection volume 24.

The fluid sensor 10 comprises a measuring element 28, which is arranged in the detection volume 24 and which is configured to receive a radiation signal 32 that is based on the thermal radiation 18 of the emitter 14 during the measurement interval. The measurement gas 26 arranged in the spatial path between the emitter 14 and the measuring element 28 can consequently at least partially form an absorption path of the fluid sensor 10. The emitter 14 may be embodied to emit the thermal radiation 18 only intermittently. At least intermittently during this time, the measuring element 28 may be embodied to receive the thermal radiation 18 in order to capture the interaction caused by the thermal radiation 18 in, on or with the measurement gas 26, for example by the deflection of a movable element, and/or to provide a corresponding signal. In simplified terms, the measuring element 28 can provide a measurement of the interaction of the thermal radiation 18 in respect to the measurement gas 26 during a measurement interval.

During the intermediate interval and optionally also at least briefly therebefore and/or thereafter, the thermal emitter 14 can be configured to emit the thermal radiation 18 with a power level that is reduced in comparison with the measurement interval or can be configured not to emit the thermal radiation 18. This means that the thermal radiation 18 is emitted with a reduced power level or not emitted at all during an intermediate interval, which is disposed outside of the measurement interval. A reduction in power can be obtained, for example, by reducing an applied DC voltage or an applied AC voltage; however, it may alternatively or additionally also be obtained by way of a changeable or reduced duty cycle of a pulse-width modulated signal (PWM signal); an increase in the thermal power can be obtained on the basis of an increase in the PWM duty cycle. As an alternative or in addition thereto, a changeable pulse density of a pulse-density modulated (PDM) signal can also be used to obtain an increase in power or reduction in power on the basis of a changeable pulse density.

The thermal emitter 16 can emit the thermal radiation 22 during the intermediate interval, i.e., intermittently or continuously during the intermediate interval. This can be implemented with a power level and can be embodied in such a way that the thermal radiation 22 likewise reaches the detection volume 24. In the case of an isolated consideration of the thermal radiation 18, an action of the thermal radiation 18 in the detection volume 24 can lead to an uptake of an energy from the thermal radiation 18 by the measurement gas 26 when proceeding from a reference state without thermal radiation 18, causing an expansion of the measurement gas 26, for example. As an alternative or in addition thereto, further constituents of the fluid sensor 10 can also absorb parts of the thermal radiation 18, for example the housing 12. This may lead to a thermal oscillation being induced on the measurement element 28 or in the detection volume 24 by an activation and a subsequent deactivation, optionally under repetition of the activation processes and/or deactivation processes, which may lead to inaccuracies in the measurement signal obtained. This may provide inaccuracies in the measurement signals, particularly in view of the fact that employed components, for instance housing parts and/or covers and the like, are embodied with increasingly reduced installation space and/or material thicknesses such that already small amounts of thermal energy suffice to cause a deformation of solids and/or a relevant expansion of gases.

At the same time, the fluid sensor 10 can be formed in such a way that the thermal emitter 14 is only activated intermittently. The thermal emitter 16 can provide the thermal radiation 22 during the intermediate intervals such that the thermal oscillation of the thermal radiation in relation to an overall power level of the thermal radiation in the detection volume is at most 50%, preferably at most 40% and particularly preferably at most 30%, during a contiguous period of time comprising the measurement interval and the intermediate interval. The overall power level can be understood to be an energy sum or energy sum spectrum which is obtained on the basis of a summation of the power level of the thermal radiation 18 and the power level of the thermal radiation 22. Expressed differently, the thermal radiation 22 can provide thermal power during the intermediate interval, said thermal power at least partly preventing a dissipation of thermal energy from the detection volume 24 during the intermediate interval such that the creation of thermal oscillations can be made more difficult, can be reduced or can even be prevented.

The thermal emitter 14 and/or the thermal emitter 16 can be formed independently of one another by a single thermal emitter. As an alternative, the first thermal emitter 14 and/or the second thermal emitter 16 in fluid sensors according to the present disclosure may be formed comprising a plurality n of radiation elements. This means that one or both of the thermal emitters 14 and/or 16 also can be formed by a plurality of thermal emitters or individual emitters/radiation elements, which together provide the thermal radiation 18 and 22, respectively. The number of individual emitters of such a distributed arrangement can be any value of n, with n≥1, n≥2, n≥3 or more, for example, n≥10 or n≥15, where n may be the same or different for the emitters 14 and 16. Expressed differently, the principle of thermal toggling or thermal modulation according to the exemplary embodiments described herein also works in very advantageous fashion in a number of n thermal sources which, for example, are actuatable differently or uniformly with a duty cycle of 100/n during the respective time interval.

The housing 12 can be arranged in an apparatus or can be a housing of the apparatus itself. By way of example, the fluid sensor 10 can form at least one part of a mobile apparatus, for example a cellular telephone or portable music device, with the exemplary embodiments described herein not being restricted thereto. Other examples of mobile apparatuses are, e.g., computers, for instance laptops or tablet computers, or else automobiles. Alternatively, it is likewise possible for the fluid sensor 10 to be provided as a stationary apparatus or for the latter to be arranged in a stationary apparatus.

The measuring element 28 can comprise a deflectable element and can be formed as a micro-electromechanical system (MEMS), for example. By way of example, the measuring element may comprise a deflectable cantilever and/or a deflectable membrane, the movement, deflection and/or acceleration of which is capturable, for example on the basis of changeable electric potentials and/or changeable electrical characteristics, for example a capacitance value.

Figure 1B:
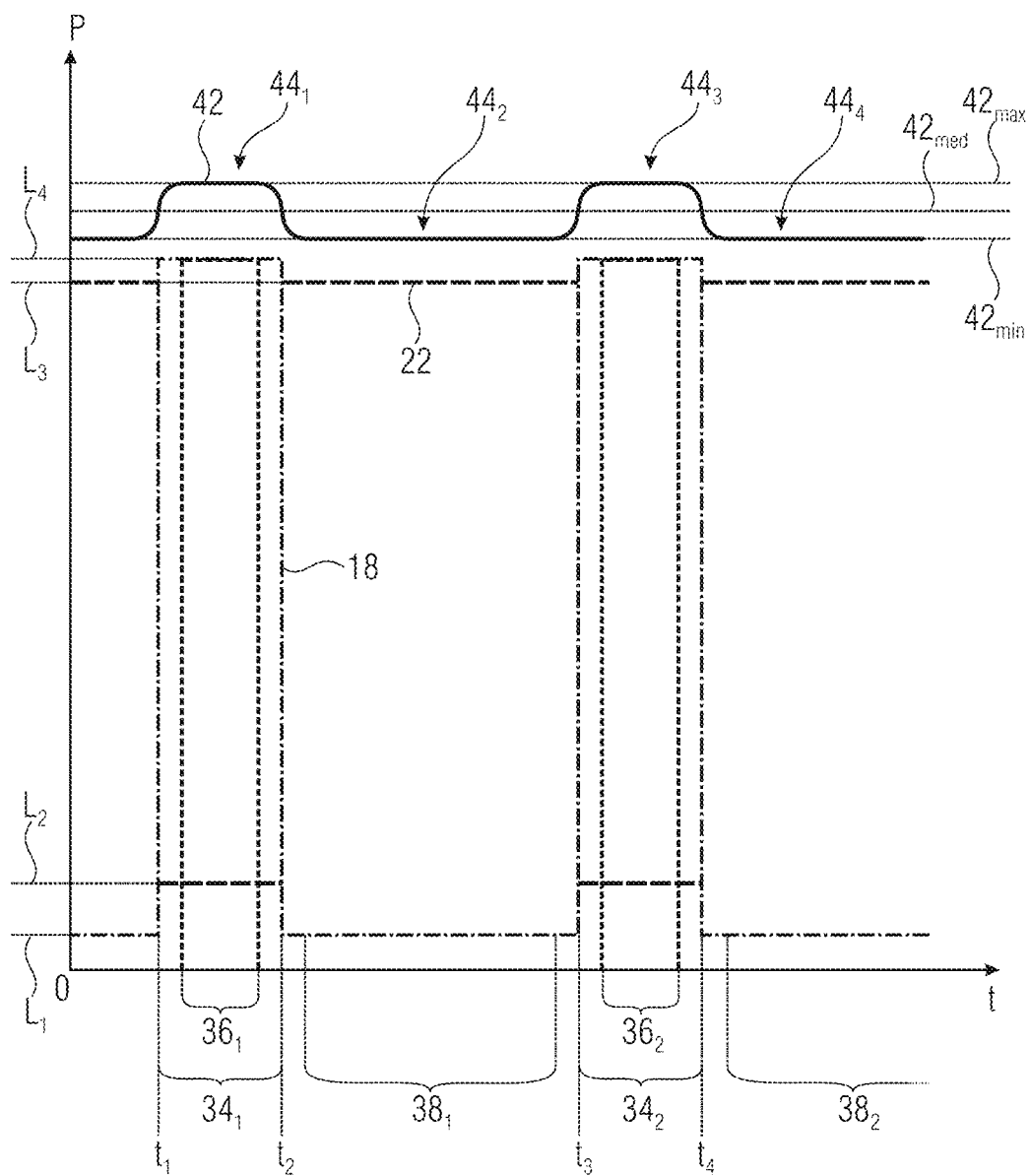
FIG. 1b shows a schematic graph of exemplary power levels of two thermal emitters of the fluid sensor from FIG. 1a, in which thermal power is plotted along an ordinate and the time is plotted along an abscissa.

FIG. 1b shows a schematic graph, in which thermal power P is plotted along an ordinate and the time t is plotted along an abscissa. In exemplary fashion, the graph illustrates a curve of thermal power levels $L_i$ of the thermal radiation 18 and 22 over time t. By way of example, the first thermal emitter 14 can be embodied to apply the thermal radiation 18 at a power level $L_4$ in time intervals 34, for example a time interval $34_1$ and/or $34_2$, said power level being higher in comparison with a power level $L_1$. Measurement intervals $36_1$ and/or $36_2$ can be disposed, in full or in part, within the time intervals $34_1$ and/or $34_2$. Even though the measurement intervals $36_i$ are represented in such a way that they have a shorter duration in time than the time intervals $34_i$, the measurement intervals $36_i$ may also have the same duration in time or even a longer duration in time. As an alternative or in addition thereto, it is possible for a starting measurement interval $36_i$ to lie before, at the same time as or after a start of the time interval $34_i$. As an alternative or in addition thereto, it is possible for an end of the measurement interval $36_i$ to lie before, at the same time as, or after an end of a respective time interval $34_i$. However, for better understanding, the measurement intervals $36_i$ are described in such a way that they are disposed within the time intervals $34_i$; this means that the thermal radiation 18 of the emitter 14 has the level $L_4$ during the measurement interval $36_i$, said level being able to be referred to as ON level of the emitter 14 in simplified fashion. During the measurement interval, the thermal radiation 18 can predominantly contribute to an operating temperature in the detection volume 24. During the intermediate interval, the thermal radiation 22, predominantly, can contribute to the operating temperature. On the basis of the small change in the thermal overall power level 42, it is consequently possible to obtain an operation of the fluid sensor in such a way that an operating temperature is obtained over a multiplicity of measurement intervals and intermediate intervals, said operating temperature remaining the same within a tolerance range of ±3° C., ±2° C. or ±1° C.

At least partly outside of the measurement intervals $36_i$, for example outside of the time intervals $34_i$, the emitter 14 can emit the thermal radiation 18 at the level $L_1$ which, in simplified fashion, can be understood to be the OFF level of the emitter 14. The level $L_1$ may have a value of zero, meaning that the emitter 14 can be deactivated and emit no residual energy or only thermal residual energy. Alternatively, an active state may also be adopted, where the following applies: $L_1 < L_4$.

Intermediate intervals $38_1$ and/or $38_2$ can be disposed between the time intervals $34_i$. The second emitter 16 can be embodied to emit the thermal radiation 22 at a power level $L_3$ during the intermediate intervals $38_i$. The power level $L_3$ is greater than a power level $L_2$, at which the emitter 16 emits the thermal radiation 22 during the measurement intervals $36_i$. The intermediate intervals $38_i$ can describe part of the period of time that is disposed between the time intervals $34_i$ or $36_i$. Alternatively, the intermediate intervals $38_i$ can also be understood to be those time intervals that are disposed between the time intervals $34_i$, during which the emitter 14 emits the thermal radiation 18 at the level $L_4$. $L_3>L_2$ may apply, where the level $L_3$ can be understood to be the ON level and the level $L_2$ can be understood to be the OFF level of the emitter 16. The level $L_2$ may have a value of zero, but it may also be a value differing therefrom, and so the thermal emitter 16 may also be embodied not to emit the thermal radiation 22, or at least emit it with a lower power level than the level $L_3$, during the OFF phase, for instance within the time interval $34_i$.

According to one exemplary embodiment, respectively one of the emitters 14 and 18 can be switched from the ON state into the OFF state at switchover times $t_i$, and the other thermal emitter 16 or 14 can be switched from the OFF state into the ON state. If thermal inertia is neglected, this facilitates an at least approximately constant thermal overall power level 42, particularly if $L_1+L_3=L_2+L_4$ applies, which may be obtained, for example, by virtue of $L_1=L_2$, for example 0, and $L_3=L_4$. A level of $L_{1=0}$ can also be understood to mean that the fluid sensor 10 may be configured to deactivate the thermal emitter 14 during the intermediate interval $38_i$.

The thermal overall power level 42 can be understood to be the sum of the individual levels prevailing at a time, and hence as an energy sum or an energy sum spectrum of the thermal radiations 18 and 22. A variation of the thermal overall power level 42 over time can be referred to as thermal oscillation or volatility, for example. Thus, the thermal overall power level 42 may vary, for example, between a minimum value $42_{min}$ and a maximum value $42_{max}$. A geometric average or median value $42_{med}$ of the thermal overall power level 42 can refer to an average between the maximum value $42_{max}$ and the minimum value $42_{min}$.

The fluid sensor 10 can be configured in such a way that a thermal oscillation of the thermal radiation in relation to a sum of the power levels of the thermal radiation 18 and a power level of the thermal radiation 22 in a contiguous time interval comprising a measurement interval and a directly adjacent intermediate interval, for example the measurement interval $36_1$ and the intermediate interval $38_1$ or the intermediate interval $38_1$ and the measurement interval $36_2$ or the measurement interval $36_2$ and the intermediate interval $38_2$ amounts to a deviation of at most ±50% in relation to the average thermal overall power level $42_{med}$ during this contiguous time interval or the contiguous period of time. This means that $42_{med} \geq 2.42_{max}$ and $42_{med} \leq 2.42_{min}$ may apply. This means that the waviness (ripples) $44_i$ in relation to the average $42_{med}$ deviates by at most an absolute value of 50% in relation to the value $42_{med}$. It is preferable for the ripples to deviate by at most ±40% or by ±30% or by even less from the value $42_{med}$. According to one exemplary embodiment, it is possible for the maximum values $42_{max}$ and minimum values $42_{min}$ to deviate from the average by no more than 10%, by no more than 5% or even by no more than 2%.

Expressed differently, the levels $L_3$ and $L_4$ may be equal, although this is not necessary. Further, the levels $L_1$ and $L_2$ may be equal, with the exemplary embodiments described herein not being restricted thereto. The first thermal emitter may be configured to emit the first thermal radiation 18 in a multiplicity of measurement intervals $36_i$ that are respectively spaced apart in time by an intermediate interval $38_i$.

Figure 1C:
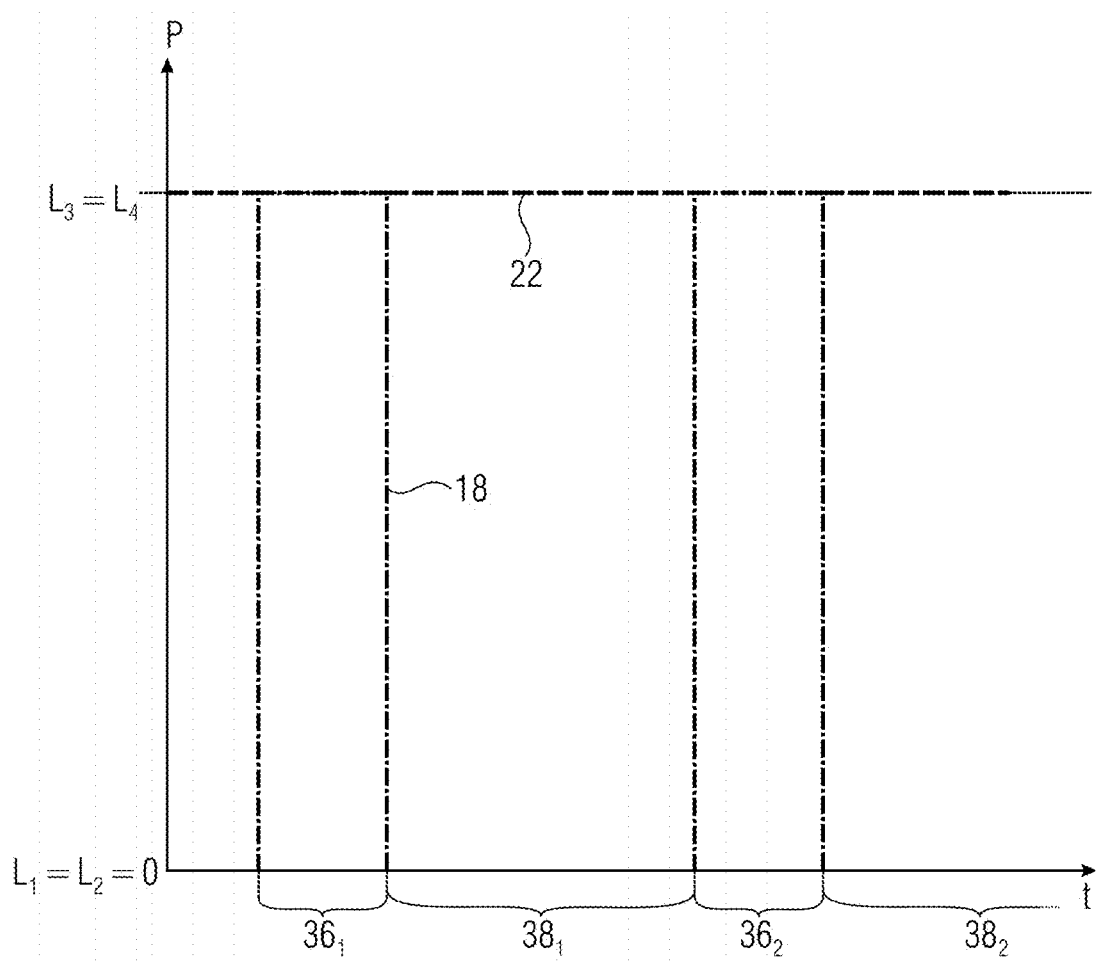
FIG. 1c shows a schematic graph of exemplary power levels of the thermal emitters of the fluid sensor of FIG. 1a, in which the OFF levels being the same and having a value of zero applies.

FIG. 1c shows a schematic graph representing power levels of the thermal emitters 14 and 16 of the fluid sensor 10, in which it holds true that the OFF levels $L_1$ and $L_2$ are the same and have a value of zero, meaning that the thermal emitters can be deactivated when the corresponding OFF level is applied. As an alternative or in addition thereto, the level $L_3$ corresponding to the level $L_4$ may apply, meaning that the ON levels may be the same. According to one exemplary embodiment, the power levels $L_3$ and $L_4$ are the same within a tolerance range of 10%, 5% or 2%. According to an alternative exemplary embodiment, the power levels $L_3$ and $L_4$ may also be the same.

Here, an actual power uptake of the respective thermal emitters 14 and 16 may be at least influenced by the configuration of the overall system and, for example, have a value of a few μW, a plurality of milliwatts up to several watts. This facilitates a temperature of a few ° C. up to several 100° C. being obtained in order to emit the thermal radiations 18 and 22, respectively.

Even though the curves of the thermal powers of the thermal radiations 18 and 22 are represented by rectangular signals, there may be slippages of the signals, for example as a result of thermal inertia of the thermal emitters 14 and/or 16 and/or of adjacent structures, for instance the housing 12 and/or the measurement gas 26.

Even though the examples explained above are written in such a way that the thermal emitter 14 has the OFF level during the intermediate interval and the thermal emitter 16 has the OFF level during the measurement interval, reference is made to the fact that this merely relates to a wavelength range of the thermal radiation 18 that is used for the measurements in conjunction with the measurement gas 26. This means that the thermal emitter 14 is configured to provide a lower power level in this wavelength range during the intermediate interval, while the thermal emitter 16 is configured to provide a low thermal power, at least in this wavelength range, during the measurement interval $36_i$.

The excitation of the measurement gas 26 may be wavelength dependent, and so the embodiments may be related to the respective wavelength range, particularly in view of the overall power level 42.

Figure 2:
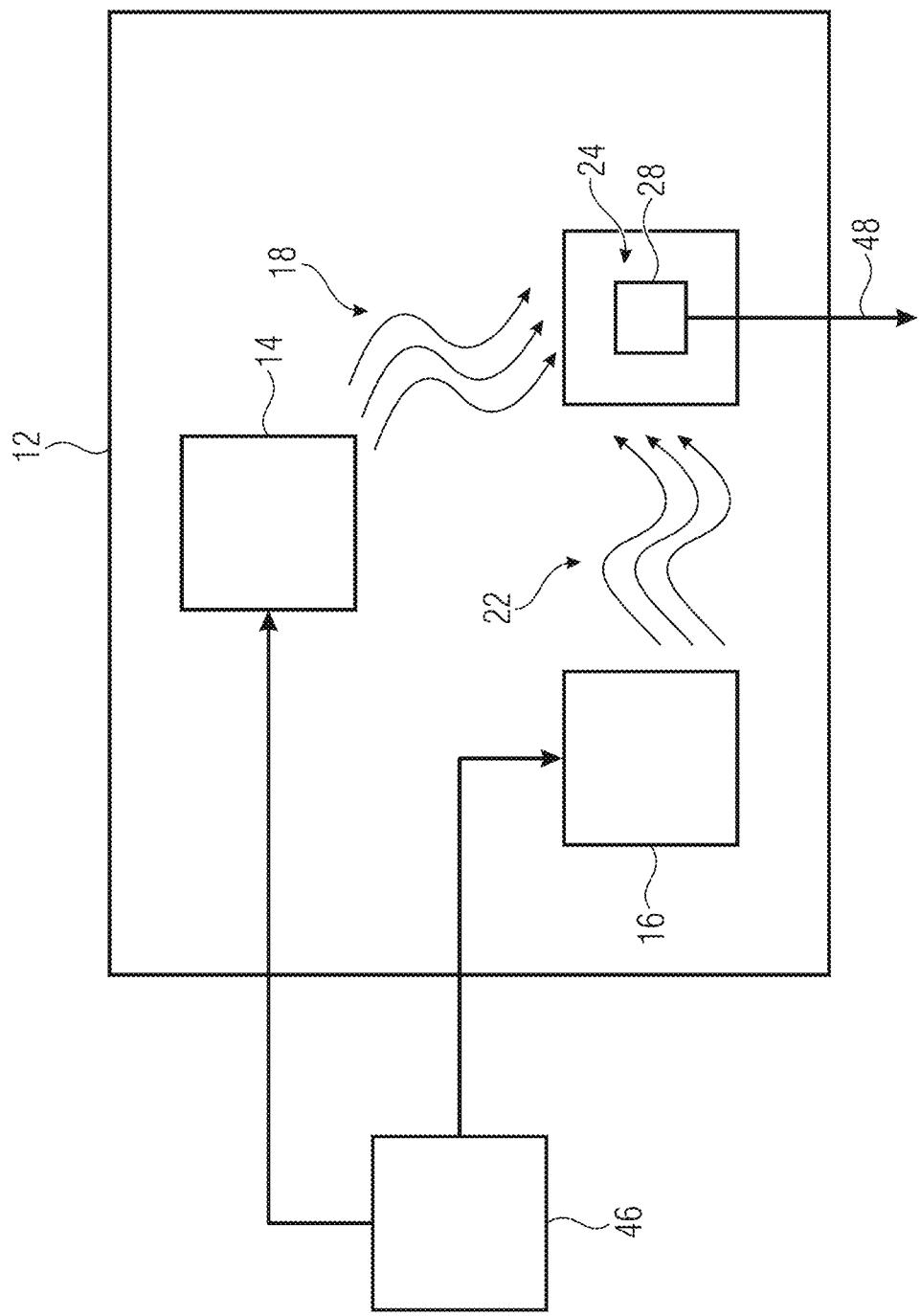
FIG. 2 shows a schematic block diagram of a fluid sensor according to a further exemplary embodiment, said fluid sensor having an actuation device that is embodied to activate the thermal emitters.

FIG. 2 shows a schematic block diagram of a fluid sensor 20 according to a further exemplary embodiment, in which the fluid sensor 20 has an actuation device 46, which is embodied to actuate the thermal emitters 14 and 16. Thus, the actuation device 46 can be embodied to actuate the thermal emitter 14 in such a way that the thermal radiation 18 is emitted at the power level $L_4$ during one or more measurement intervals and said thermal radiation is emitted at the reduced power level $L_1$ or not emitted at all during one or more intermediate intervals. This means $L_1=0$. As an alternative or in addition thereto, the actuation device 46 can be embodied to actuate the thermal emitter 16 in such a way that the latter emits the thermal radiation 22 during the intermediate interval or during a plurality of intermediate intervals and emits said thermal radiation at a reduced second power level $L_2$ or not at all during the measurement interval.

The measuring element 28 can be configured to provide a measurement signal 48 on the basis of the deflection of the movable element such that conclusions about the deflection can be drawn on the basis of the measurement signal 48 and a property of the measurement gas, for example a type of substance contained therein and/or a concentration of same, can be deduced on the basis of the knowledge of the emitted thermal radiation or an actuation of the respective thermal emitter 14 and/or 16 and a property of the measuring element 28.

Figure 3C:
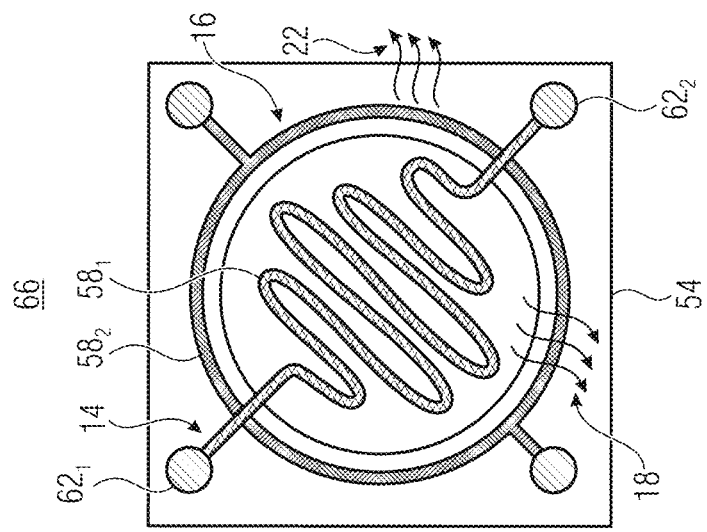
Figure 3B:
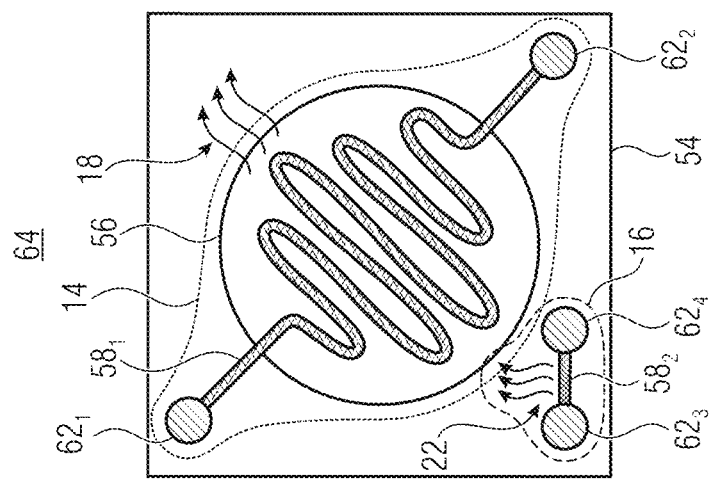
FIG. 3b shows a schematic plan view of a thermal emitter, which has two conductive structures, according to a further exemplary embodiment.
Figure 3A:
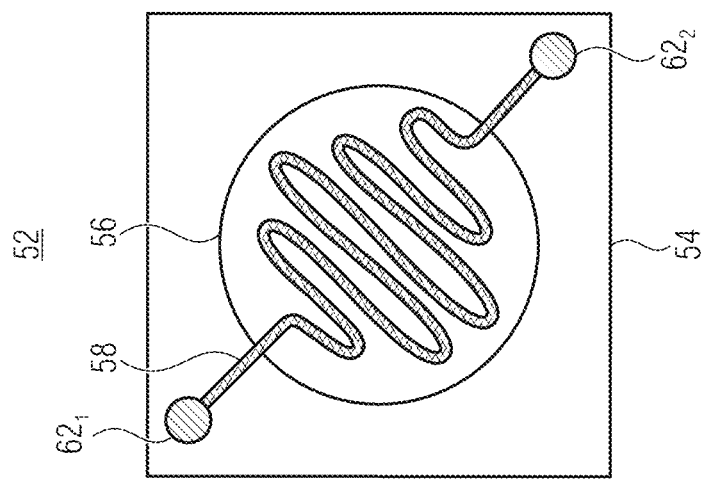
FIG. 3a shows a schematic plan view of a thermal emitter according to one exemplary embodiment.

FIG. 3a shows a schematic plan view of a thermal emitter 52. The structure of the emitter 52 can be usable as emitter 14 or as emitter 16. By arranging the thermal emitter 52 twice, it is possible to implement both the thermal emitter 16 and the thermal emitter 14. The thermal emitter 52 can have a substrate 54, which may comprise a semiconductor material, for example, e.g., silicon or gallium arsenite. A carrier structure 56 may be arranged on the substrate 54. Compared to the substrate 54, the carrier structure 56 may have a lower heat capacitance. By way of example, a region of the carrier structure 56 may be thinned, at least locally, in a layer stack or an individual layer of the substrate 54 in order to form the carrier structure 56. The carrier structure 56 may comprise the same material and/or a different material to the substrate 54. Without loss of generality, it is also possible to provide a greater number or smaller number of layers or layer sequences on the carrier structure 56 when this is compared with a configuration of the substrate 54.

The thermal emitter 52 may have a conductor structure 58, arranged, for example, between two electrical contacts $62_1$ and $62_2$, such that an electric current flows through the electrically conductive conductor structure 58 when an electric potential is applied between the electrical contacts $62_1$ and $62_2$ and thus leads to heating of the electrically conductive conductor structure 58. The heating can be transferred to the carrier structure 56, for example a membrane, and so the carrier structure 56 can emit thermal radiation in combination with the electrical conductor structure 58 arranged thereon on the basis of the passage of the electric current.

FIG. 3b shows a schematic plan view of a thermal emitter 64 which, for example as described in conjunction with FIG. 3a, may have conductor structure $58_1$, which is arranged on the carrier structure 56. By way of example, the conductor structure $58_1$ can be usable as a thermal emitter 14. A further conductor structure $58_2$ can be arranged on the substrate between two electrical contacts $62_3$ and $62_4$ and said further conductor structure can be configured to emit the thermal radiation 22 on the basis of an electric potential between the electrical contacts $62_3$ and $62_4$ and an electric current flow through the electrically conductive conductor structure $58_2$ facilitated thereby. This means that the thermal emitter can also implement or provide the thermal emitter 16 in addition to the thermal emitter 14. The conductor structure $58_2$ may have any form that allows the thermal radiation 22 to be emitted.

FIG. 3c shows a schematic plan view of a thermal emitter 66, which is likewise configured to implement the functionality of the thermal emitter 14 and of the thermal emitter 16. To this end, the conductor structure $58_2$ can be arranged in such a way, for example, that it surrounds a region in which the conductor structure $58_1$ meanders in order to preferably or efficiently emit the thermal radiation 18 there. By way of example, the conductor structure $58_2$ can surround the carrier structure 56. The surrounding configuration facilitates a uniform thermal load in the material of the thermal emitter 66, leading to uniform or symmetric thermal loads such that material fatigue is reduced or prevented.

FIG. 4a shows a schematic side sectional view of a fluid sensor 40 according to one exemplary embodiment. By way of example, the fluid sensor 40 can be usable as a microphone at the same time. The housing may have at least one first part $12_1$ and one second part $12_2$, wherein the part $12_2$ may form a carrier circuit board or conductor circuit board, for example. By way of example, a part of the housing may have an entrance opening 68, which is configured to fluidically couple the measuring element 28 to the surroundings or environment of the fluid sensor 40. Thus, for example, a sound pressure in a fluid surrounding the fluid sensor 40 can reach the measuring element 28 through the entrance opening 68.

The measuring element 28 is a MEMS microphone with a membrane element, for example, wherein the MEMS microphone is configured to provide a corresponding signal on the basis of the fluid pressure. The membrane element can be designed to be deflected on the basis of a radiation signal produced by the thermal radiation 18 or a filtered version thereof, said radiation signal being based on an excitation of the measurement gas in the detection volume on the basis of the thermal radiation 18. The measuring element 28 can be embodied to provide a measurement signal, for instance a sensor signal or a preliminary stage thereof to be processed, this being based on the deflection of the membrane element. To this end, the measuring element 28 is electrically connected to an evaluation device 72, for example, the latter for example being able to capture the measurement signal 48 from the detection element 28. With reference being made to FIG. 2 again, the measurement signal 48 can be influenced or produced herein both by the fluidic ambient pressure or a pressure change, and, as an alternative or in addition thereto, by the excitation of the measurement gas 26 by the thermal radiation 18 in the detection volume 24.

The measurement gas 26 can enter the detection volume 26 through the entrance opening 68. As an alternative or in addition thereto, it is possible to provide a further opening in the housing 12, said opening allowing a measurement gas to be examined to reach the detection volume 24.

The detection element 28 and/or the evaluation device 72 can be arranged at the location of an axis of symmetry or a plane of symmetry 74, meaning that a common device of the detection element 28 and/or the evaluation device 72 can be penetrated by the axis of symmetry or the plane of symmetry 74.

The first and the second thermal emitter can be arranged symmetrically in respect of the measuring element 28 or the axis of symmetry or plane of symmetry 74. By way of example, the thermal emitters 14 and 16 of FIG. 1 can be implemented by a configuration according to the thermal emitter 52 of FIG. 3a, with another implementation also being possible, for example an implementation according to FIG. 3b and/or FIG. 3c, wherein the thermal emitters of the fluid sensor may have the same embodiment or different embodiments.

According to one exemplary embodiment, a thermal emitter 52a is configured to implement the functionality of the thermal emitter 16, while a further thermal emitter 52b is configured to implement the functionality of the thermal emitter 14. An optical filter 76, which is configured to have a pass region or stop region, can be arranged between the thermal emitter 52b and the detection volume 24. The stop region can be understood to be a wavelength range in which the optical filter 76 reflects or damps the thermal radiation 18 to a great extent, or reflects or damps said thermal radiation to a greater extent than in other wavelength regions. The pass region can be understood to be a wavelength region in which the optical filter 76 reflects or damps the thermal radiation 18 to a lower extent than in other wavelength regions. The optical filter 76 is configured to provide filtered thermal radiation 18', which provides the excitation of the measurement gas 26 or of another fluid arranged herein.

A measurement-wavelength-suppressing element 78 is arranged between the thermal emitter 52a and the detection volume. The measurement-wavelength-suppressing element 78 is configured to at least partly suppress the thermal radiation 22 in the pass region of the optical filter 76. By way of example, an amplitude of damped or reduced or suppressed thermal radiation 22' in the pass region of the optical filter 76 has a value of at most 30%, at most 20% or at most 10% of an amplitude of the filtered first thermal radiation 18' in this wavelength region. The measurement-wavelength-suppressing element 78 can be embodied as a Bragg element and/or as a reflection element, for example, and can be referred to as an optical blocker. This allows thermal power and/or thermal radiation to be obtained by the thermal emitter 52a in the detection volume 24 or at the location of the measuring element 28 on the basis of an activation of the thermal emitter 52a.

Both thermal emitters 52a and 52b can provide a respective thermal power. Thermal radiations can reach the detection volume, for example the radiation 18 and 22 passing respectively through the optical filter 76 and the measurement-wavelength-suppressing element 78. Heating of the housing part $12_2$ and/or heating of the housing part $12_1$ can be obtained as a result thereof and via parasitic paths such as direct radiation by the emitters into the substrate and/or housing.

FIG. 4a shows the fluid sensor 40, for example in the state as it may be obtained in an intermediate interval. The thermal emitter 52a can emit the thermal radiation 22 while the thermal emitter 52b is inactive, for example.

FIG. 4b shows the fluid sensor 40 in a state as may be obtained, for example, during the measurement interval. By way of example, the thermal emitter 52a can be inactive and the thermal emitter 52b can be configured to emit the thermal radiation 18 that is filtered by the optical filter 76 in order to obtain the filtered thermal radiation 18', infrared (IR) radiation, for example. The filtered thermal radiation 18' can interact with the measurement gas 26, and so, on the basis of a deflection of the movable element of the measuring element 28, it is possible to draw conclusions about the radiation signal 82 obtained thus, which may be the radiation signal 32, for example.

The membrane of the thermal emitter 52b can heat up to a temperature of, for example, more than 300° C., more than 400° C., more than 500° C. or more than 550° C., for example in a region of approximately 600° C. up to 900° C. By way of example, temperature regions from approximately 150° C. to 300° C. can be used for some chemical sensors. Temperature regions of more than approximately 450° C. can be used for some physical sensors.

By way of example, the optical filter 76 can have a pass region in the region of 4.2 μm such that infrared radiation, for example, can penetrate or pass the optical filter 76.

Consequently, on the basis of a comparable thermal power of the emitters 52a and 52b and an equal distance from the axis of symmetry or plane of symmetry 74, it is possible to obtain a uniform thermal load or heating at the location of the measuring element 28, within the scope of which the operating temperature in the contiguous time intervals comprising at least one measurement interval and at least one intermediate interval remains the same within the tolerance range of at most ±3° C., at most ±2° C. or at most ±1° C.

Even though the fluid sensor 40 is described in such a way that the measurement-wavelength-suppressing element 78 is configured as an optical blocker, the measurement-wavelength-suppressing element 78 can also be configured as an optical filter that has a pass region that is different and preferably disjoint from the pass region of the optical filter. Consequently, filtered thermal radiation 22' can be obtained on the basis of the thermal radiation 22, said filtered thermal radiation having a different wavelength range from the filtered thermal radiation 18. This allows different constituents in the measurement gas 26 to be excited by different wavelengths, and so a further sensor signal can be output using the measuring element 28 or a further measuring element. This further sensor signal may contain information items in respect of another fluid constituent. This means that different constituents in the measurement gas 26 can be excited on the basis of the different filtered thermal radiations 18' and 22', wherein the respective reaction in the measurement interval or the intermediate interval can be captured by the detection element 28 (or another detection element), and so the measurement gas 26 can be examined in respect of different constituents on the basis of the thermal emitter 52a and 52b.

This means that the measuring element 28 can be embodied to provide a first sensor signal on the basis of the radiation signal 82 received during the measurement interval and provide a second sensor signal on the basis of the radiation signal received during the intermediate interval, said radiation signal being based on an excitation of the measurement gas 26 on the basis of the thermal radiation 22, wherein the different sensor signals have information items about different constituents of the measurement gas 26. The radiation signal 32 or 82 can be the first radiation signal. The measuring element 28 can be configured to provide a first measurement signal on the basis of the first radiation signal. A second radiation signal can be received during the intermediate interval, said second radiation signal being based on the second thermal radiation. The measuring element can be configured to provide a second measurement signal on the basis of the second radiation signal.

Expressed differently, FIGS. 4a and 4b exhibit an option of reducing the effect of passive heating. The thermal emitters 52a and 52b can be formed to be the same or even equal, wherein an optical blocker, for instance comprising an opaque material, is arranged in respect of the thermal emitter 52a. The emitters 52a and 52b can be switched over in opposition, and so the energy sum remains at least approximately constant.

Figure 5A:
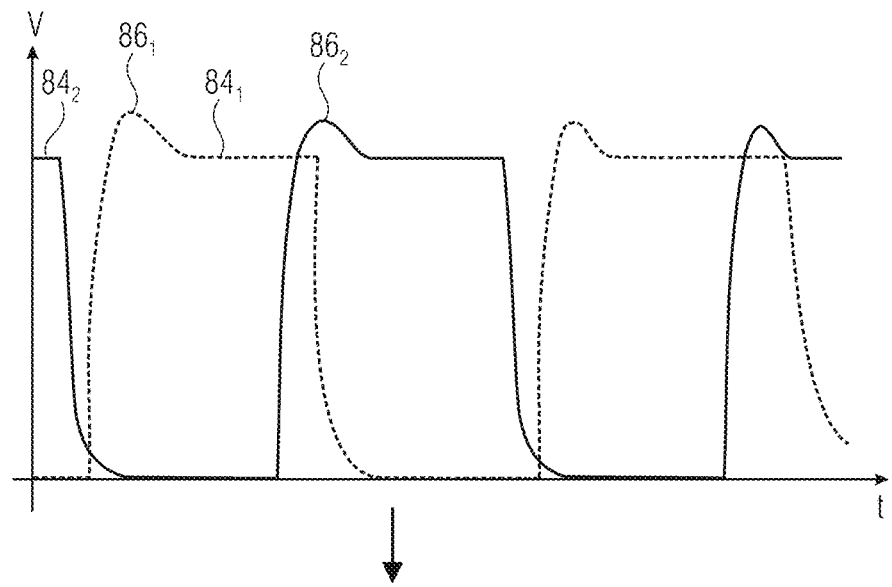
FIG. 5a shows a schematic graph in which actuation voltages of the thermal emitters of a fluid sensor are plotted according to the exemplary embodiments described herein as a voltage variable over time.

FIG. 5a shows a schematic graph in which an actuation voltage $84_1$ of the first thermal emitter 14 or 52b and a second actuation voltage $84_2$ of the second thermal emitter 16 or 52a are plotted over time t as a voltage variable V. The thermal uptake capabilities of the materials can lead to overshoots $86_1$ and $86_2$ in the voltage signals.

Figure 5B:
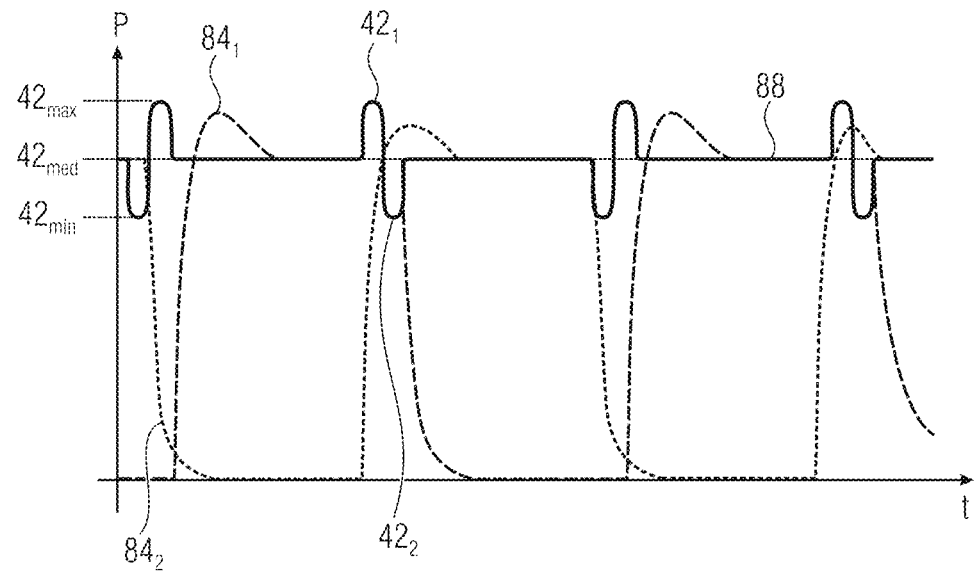
FIG. 5b shows a schematic graph of a summed signal, for example of a thermal overall power level described in conjunction with FIG. 1b.

FIG. 5b shows a schematic graph of a summation signal 88, which may correspond to the thermal overall power level 42 described in conjunction with FIG. 1b, for example. This means that the ripples $42_1$ and $42_2$ deviate at most ±50% from the average thermal power $42_{med}$.

The comparatively elevated temperature influx by the addition of the second thermal emitter leads to no impairment, or at most a negligible impairment, of the measurement results. Although the additional temperature may cause an additional constant component in the measurement curves, the latter can be removed by calculation by way of appropriate signal processing, in particular the membrane evaluation.

Figure 6A:
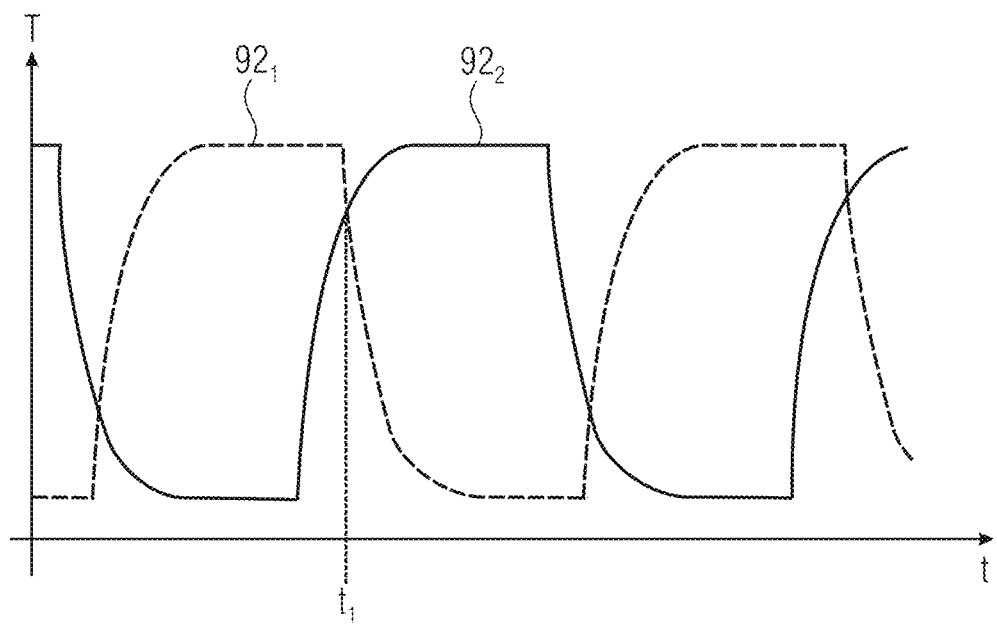
FIG. 6a shows a schematic graph of a possible temperature curve in a detection volume according to an exemplary embodiment.

FIG. 6a shows a schematic graph of a possible temperature curve in the detection volume. A first temperature contribution $92_1$ can be obtained on the basis of the activation of the thermal emitter 14 or 52b. A second temperature contribution $92_2$ can be obtained on the basis of the activation of the thermal emitter 16 or 52a. Although both temperature contributions $92_1$ and $92_2$ can contribute to a heating of the detection volume at certain times, for example at the time $t_1$, the operating temperature obtained overall may remain the same within the tolerance range of ±3° C., ±2° C. or ±1° C.

Figure 6B:
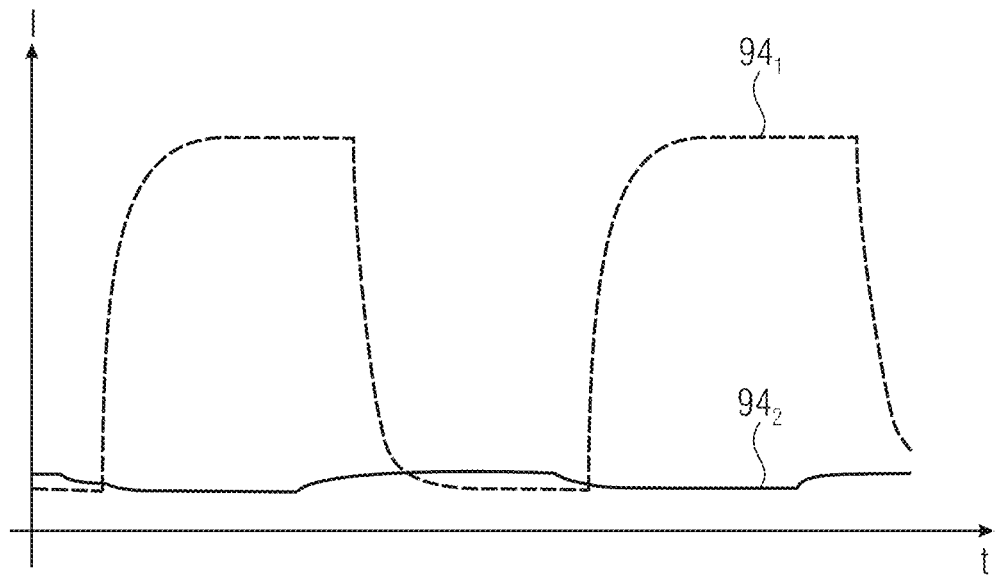
FIG. 6b shows a schematic curve of an intensity, which excites a specific constituent part of a measurement gas, over time and according to one exemplary embodiment.

FIG. 6b shows a schematic curve of an intensity I, which excites a specific constituent part of the measurement gas 26, over time t. On the basis of the measurement-wavelength-suppressing element 78, a small or no intensity contribution $94_2$ can be obtained from the thermal emitter 16 or 52a in the measurement wavelength range despite actuation of the thermal emitter 16 or 52a, while the intensity contribution $94_1$ in the measurement wavelength range is cyclically activatable and deactivatable since the measurement wavelength can pass through the optical filter 76.

Referring back to FIGS. 3a to 3c, the integration of a passive heater structure, which at least approximately takes up the same amount of energy, can be arranged directly on the chip. The line illustrated in FIG. 3b or the ring illustrated in FIG. 3c can lead to a comparatively small influence on the temperature of the structure itself, even if the same amount of power is introduced into the system; this can be distributed by the semiconductor material of the emitters, in particular to a substrate lying therebelow and to the system. A heater system or heater structure produced thus may have a low thermal resistivity in comparison with the thermal emitter 52a or the conductor structure thereof. This may lead to a comparable temperature influx through both conductor structures.

Expressed differently, FIGS. 5a, 5b, 6a and 6b show that while the energy flux and the temperature of the emitter membranes are approximately the same within a period if the transitions are neglected, this does not apply to the radiation intensity. The parasitic thermal effect can be strongly reduced while the modulation depth of the photoacoustic effect (difference between the intensity contributions $94_1$ and $94_2$) can be fully maintained.

As a result of the additional arrangement of the second thermal emitter 16 or 52a in respect of the thermal emitter 14 or 52b, it is possible to obtain an overall higher temperature of the overall apparatus; however, this is not very bothersome or is not damaging since, in return, a constant temperature can be obtained. This constant temperature facilitates a precise measurement.

Exemplary embodiments can be used in miniaturized photoacoustic sensors and miniaturized PAS systems which, as a result of the increasing miniaturization, are increasingly influenced by parasitic thermal couplings, in particular as a result of heating and cooling of the package and the air (measurement gas) situated therein. Exemplary embodiments reduce this influence by the provision of a second thermal emitter with optical radiation that is reduced (at least in the measurement wavelength region) but with at least approximately the same power influx. Since the summed power remains constant, the effect on the package by switching the (primary) emitter from radiating to not radiating is reduced, and so the system reacts predominantly or exclusively to the measurement gas, which is measured by the photoacoustic effect. The additional second emitter 16 or 52a can be used to capture a second gas or gas constituent and/or it can be used as a reference channel in order to calibrate the system during operation (in the field).

In simplified terms, this can be understood to mean the secondary heater, i.e., the conductor structure $58_2$, maintains the temperature in the system while the deactivation of the conductor structure $58_1$ would bring about cooling of the system.

Exemplary embodiments relate to miniaturized PAS systems on a new level. This is achieved by virtue of the thermoacoustic effect, which usually is one up to four orders of magnitude greater than the photoacoustic effect in respect of the amplitude, being reduced. PAS systems according to the exemplary embodiments described herein can be used in arbitrary systems and, for example, can be used to take account of the growing health considerations caused by air pollution. A great demand for comfort and well-being emerges. A significant potential for energy efficiency in buildings, for example to determine the necessity of venting processes or the like, is also determinable. Exemplary embodiments render it possible to determine an air quality in real time, for example by virtue of positive or negative constituents in the ambient air being determined by the measurement processes.

The exemplary embodiments described herein can be used as chemo sensors or graphene sensors, for example. As an alternative or in addition thereto, the exemplary embodiments described herein can also be employable as MUX sensors.

In principle, the capture of ambient parameters such as noise, sounds, temperatures and/or gases will become increasingly important in view of mobile apparatuses, buildings, automation, industrial applications and in the automotive sector. Damaging fluid concentrations and gas concentrations can be caused by pollution and/or malfunctions of certain appliances. Such a gas measurement by way of cheap, constantly available and interconnected sensors is an increasingly important topic, even in future. Even though the exemplary embodiments described herein were described in conjunction with the use of a microphone structure, other exemplary embodiments can also be used as a sonometer or gas sensor. The exemplary embodiments can be implemented by analog circuits and/or by digital signal post-processing.

The exemplary embodiments described herein overcome the susceptibility of miniaturized PAS systems in respect of their sensitivity to noise caused by heating of the package and the expansion of air in the measuring cell. As a result of this, it is possible to implement robust photoacoustic sensors, which allow the cost-effective concept of photoacoustic sensors to be implemented effectively.

The exemplary embodiments described herein relate to a concept of equalizing the variation of the energy influx into a PAS system. As a result of this equalization of the thermal influx, the thermoacoustic effect can be greatly reduced in the measurements. To this end, exemplary embodiments propose the use of a second emitter which, at least in the measurement wavelength region, has greatly reduced IR emissions, such that the use of mechanical shutters or comparable structures can be dispensed with and, nevertheless, the thermoacoustic effect can be reduced. The second thermal emitter can provide a reference channel in order to capture a second gas.

Figure 7:
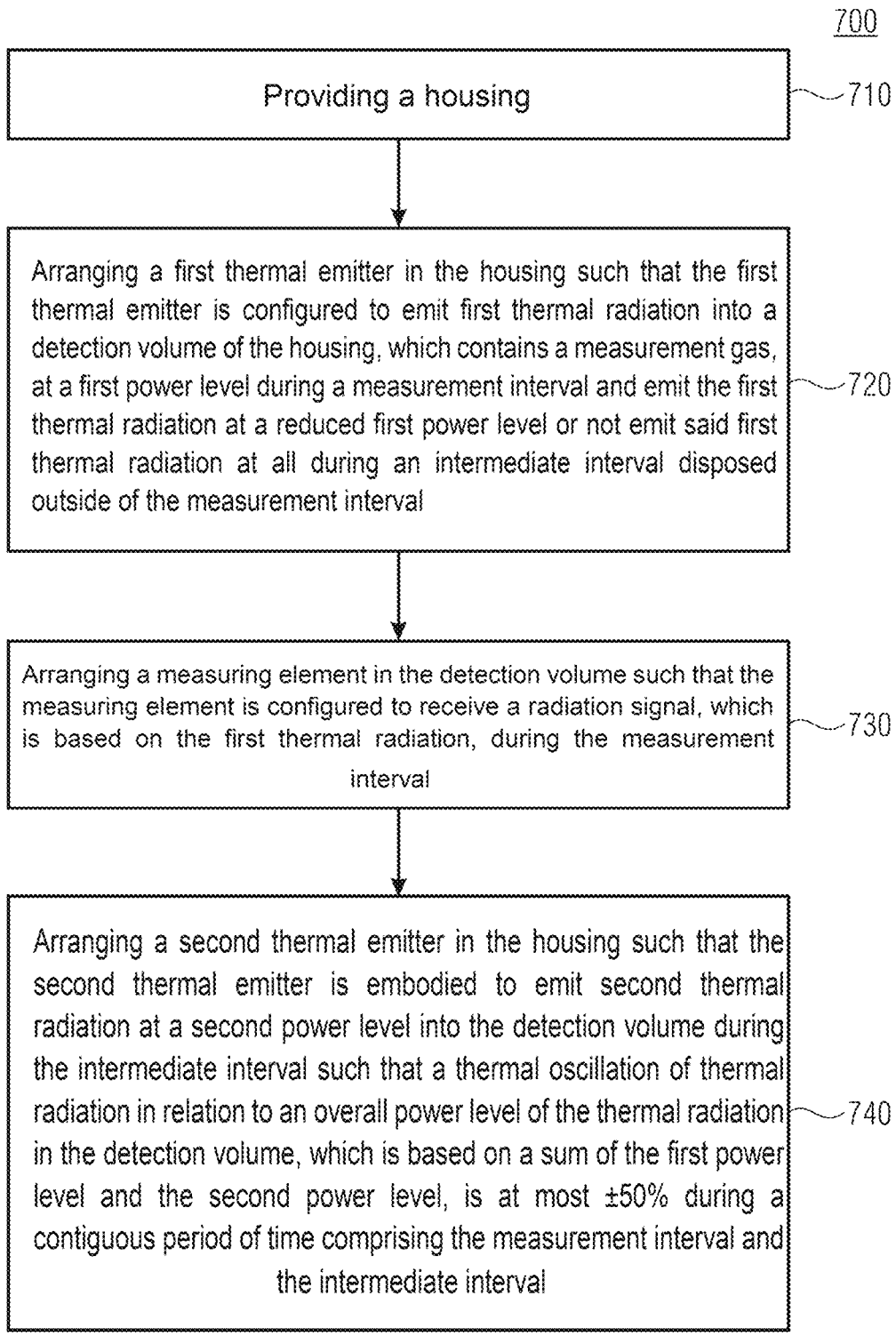
FIG. 7 shows a schematic flowchart of a method for providing a fluid sensor according to an exemplary embodiment.

FIG. 7 shows a schematic flowchart of a method 700 for providing a fluid sensor, for example the fluid sensor 10, 20 or 40. The method comprises a step 710 with a provision of a housing. A step 720 comprises an arrangement of a first thermal emitter in the housing such that the first thermal emitter is configured to emit first thermal radiation into a detection volume of the housing, which contains a measurement gas, at a first power level during a measurement interval and emit the first thermal radiation at a reduced first power level or not emit said first thermal radiation at all during an intermediate interval disposed outside of the measurement interval. A step 730 comprises an arrangement of a measuring element in the detection volume such that the measuring element is configured to receive a radiation signal, which is based on the first thermal radiation, during the measurement interval. The method 700 comprises a step 740 with an arrangement of a second thermal emitter in the housing such that the second thermal emitter is embodied to emit second thermal radiation at a second power level into the detection volume during the intermediate interval such that a thermal oscillation of thermal radiation in relation to an overall power level of the thermal radiation in the detection volume, which is based on a sum of the first power level and the second power level, is at most ±50% during a contiguous period of time comprising the measurement interval and the intermediate interval.

Even though some aspects were described in conjunction with an apparatus, it is understood that these aspects also represent a description of the corresponding method, and so a block or component of an apparatus should also be understood to be a corresponding method step or a feature of a method step. In a manner analogous thereto, aspects that were described in conjunction with, or as, a method step also represent a description of a corresponding block or detail or feature of a corresponding apparatus.

The above-described exemplary embodiments only represent an elucidation of the principles of the present invention. It is understood that modifications and variations of the arrangements and details described herein will be clear to other persons skilled in the art. Therefore, the intention is that the invention is only restricted by the scope of protection of the patent claims below and not by the specific details that were presented herein on the basis of the description and on the basis of the explanation of the exemplary embodiments.

What is claimed is:

1. A fluid sensor comprising:
   a housing;
   a first thermal emitter that is arranged in the housing and configured to:
   emit first thermal radiation into a detection volume of the housing, which contains a measurement gas, at a first power level during a measurement interval, and
   emit the first thermal radiation at a reduced first power level during an intermediate interval disposed outside of the measurement interval or not emit said first thermal radiation at all during the intermediate interval;
   a measuring element that is arranged in the detection volume and configured to receive a radiation signal, which is based on the first thermal radiation, during the measurement interval; and
   a second thermal emitter that is arranged in the housing and embodied to emit second thermal radiation at a second power level into the detection volume during the intermediate interval such that a thermal oscillation of thermal radiation in relation to an overall power level of the thermal radiation in the detection volume, which is based on a sum of the first power level and the second power level, is at most ±50% during a contiguous period of time comprising the measurement interval and the intermediate interval.

2. The fluid sensor as claimed in claim 1, configured to deactivate the first thermal emitter during the intermediate interval.

3. The fluid sensor as claimed in claim 1, further comprising an actuation device that is embodied to actuate the first thermal emitter in such a way that the latter:
   emits the first thermal radiation during the measurement interval at the first power level, and
   emits said first thermal radiation at the reduced first power level during the intermediate level or not at all during the intermediate interval,
   wherein the actuation device is further embodied to actuate the second thermal emitter in such a way that the latter;
   emits the second thermal radiation during the intermediate interval, and
   emits said second thermal radiation at a reduced second power level during the measurement interval or not at all during the measurement interval.

4. The fluid sensor as claimed in claim 1, wherein the first thermal emitter is configured to emit the first thermal radiation in a multiplicity of measurement intervals that are respectively spaced apart in time by an intermediate interval.

5. The fluid sensor as claimed in claim 1, wherein the radiation signal is a first radiation signal and wherein the measuring element is configured to provide a first measurement signal on the basis of the first radiation signal and receive a second radiation signal during the intermediate interval, said second radiation signal being based on the second thermal radiation, and provide a second measurement signal on the basis of the second radiation signal.

6. The fluid sensor as claimed in claim 1, wherein the measuring element is embodied to capture an excitation of the measurement gas on the basis of the radiation signal, wherein the excitation is based on the first thermal radiation, wherein the fluid sensor comprises an optical filter that is arranged between the first thermal emitter and the detection volume, wherein the optical filter has a first pass range and is configured to filter the first thermal radiation in order to obtain filtered first thermal radiation,
   wherein the fluid sensor has an element that suppresses a measurement wavelength, said element being arranged between the second thermal emitter and the detection volume and being configured to at least partly suppress the second thermal radiation in the first pass range.

7. The fluid sensor as claimed in claim 6, wherein the radiation signal is a first radiation signal, wherein the optical filter is a first optical filter, wherein the element suppressing the measurement wavelength is a second optical filter with a second pass range such that filtered second thermal radiation is obtained on the basis of the second thermal radiation, wherein the first and the second pass range are disjoint,
   wherein the fluid sensor is embodied to output a first sensor signal, which is based on the first radiation signal and which has an information item in respect of a first fluid constituent, and
   wherein the fluid sensor is embodied to output a second sensor signal, which is based on a second radiation signal, wherein the second radiation signal is based on an excitation of the measurement gas by the filtered second thermal radiation during the intermediate interval, wherein the second sensor signal has an information item in respect of a second fluid constituent.

8. The fluid sensor as claimed in claim 1, wherein the measuring element is embodied to provide a first sensor signal on the basis of the radiation signal received during the measurement interval and to provide a second sensor signal on the basis of a second radiation signal received during the intermediate interval, said second radiation signal being based on an excitation of the measurement gas on the basis of the second thermal radiation, wherein the first sensor signal and the second sensor signal have information items about different constituents of the measurement gas.

9. The fluid sensor as claimed in claim 1, wherein the first thermal radiation predominantly contributes to an operating temperature in the detection volume during the measurement interval and wherein predominantly the second thermal radiation contributes to the operating temperature during the intermediate interval, wherein the operating temperature remains the same within a temperature tolerance range of ±3° C. over a multiplicity of measurement intervals and intermediate intervals during operation of the fluid sensor.

10. The fluid sensor as claimed in claim 1, wherein the first thermal emitter and the second thermal emitter are arranged symmetrically in the housing with respect to the measuring element.

11. The fluid sensor as claimed in claim 1, wherein the first thermal emitter and the second thermal emitter are arranged in the housing in axisymmetric fashion with respect to the measuring element with respect to an axis of symmetry, wherein the axis of symmetry extends through the measuring element.

12. The fluid sensor as claimed in claim 1, wherein the first power level and the second power level are equal within a tolerance range of 10%.

13. The fluid sensor as claimed in claim 1, wherein the first thermal radiation and the second thermal radiation are partly absorbed by the housing and/or the detection volume and contribute to the thermal oscillation.

14. The fluid sensor as claimed in claim 1, wherein the measuring element has a MEMS microphone with a membrane element, wherein the membrane element is designed to be deflected on the basis of the radiation signal that is based on an excitation of the measurement gas on the basis of the first thermal radiation and provide a measurement signal that is based on the deflection of the membrane element.

15. The fluid sensor as claimed in claim 1, formed as a thermoacoustic fluid sensor.

16. The fluid sensor as claimed in claim 1, wherein the first thermal emitter comprises a first membrane structure and a first electrical conductor structure arranged thereon such that the first electrical conductor structure partly covers the first membrane structure, wherein the first electrical conductor structure is embodied to provide heating of the first membrane structure on the basis of a current flow through the first electrical conductor structure and thus produce the first thermal radiation.

17. The fluid sensor as claimed in claim 16, wherein the second thermal emitter comprises a second electrical conductor structure, which is arranged adjacent to the first membrane structure on a membrane substrate of the first membrane structure, wherein the second electrical conductor structure is embodied to produce the second thermal radiation on the basis of a current flow through the second electrical conductor structure.

18. The fluid sensor as claimed in claim 17, wherein the second electrical conductor structure surrounds the first membrane structure.

19. The fluid sensor as claimed in claim 16, wherein the second thermal emitter comprises a second membrane structure and a second electrical conductor structure arranged thereon such that the second electrical conductor structure partly covers the second membrane structure, wherein the second electrical conductor structure is embodied to provide heating of the second membrane structure on the basis of a current flow through the second electrical conductor structure and thus produce the second thermal radiation.

20. The fluid sensor as claimed in claim 1, wherein the first thermal emitter and/or the second thermal emitter are formed comprising a multiplicity of radiation elements.

21. A method for providing a fluid sensor, the method comprising:
providing a housing;
arranging a first thermal emitter in the housing such that the first thermal emitter is configured to:
emit first thermal radiation into a detection volume of the housing, which contains a measurement gas, at a first power level during a measurement interval, and
emit the first thermal radiation at a reduced first power level during an intermediate interval disposed outside of the measurement interval or not emit said first thermal radiation at all during the intermediate interval;
arranging a measuring element in the detection volume such that the measuring element is configured to receive a radiation signal, which is based on the first thermal radiation, during the measurement interval; and
arranging a second thermal emitter in the housing such that the second thermal emitter is embodied to emit second thermal radiation at a second power level into the detection volume during the intermediate interval such that a thermal oscillation of thermal radiation in relation to an overall power level of the thermal radiation in the detection volume, which is based on a sum of the first power level and the second power level, is at most ±50% during a contiguous period of time comprising the measurement interval and the intermediate interval.

* * * * *